W. GOWLLAND.
LENS MEASURE.
APPLICATION FILED DEC. 14, 1912.
1,136,419.
Patented Apr. 20, 1915.
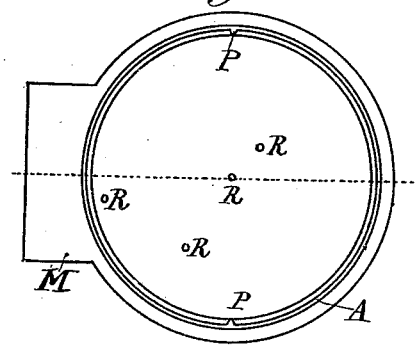
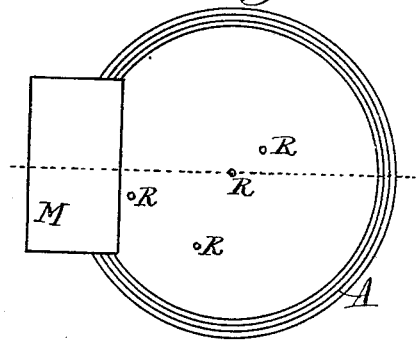
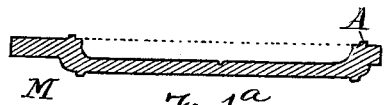
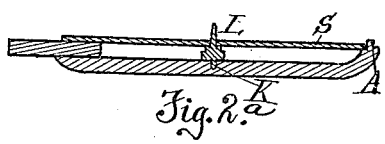
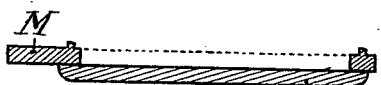
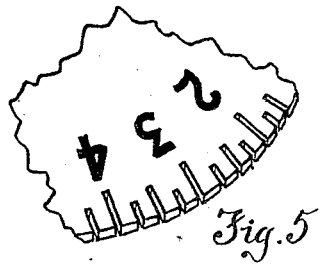
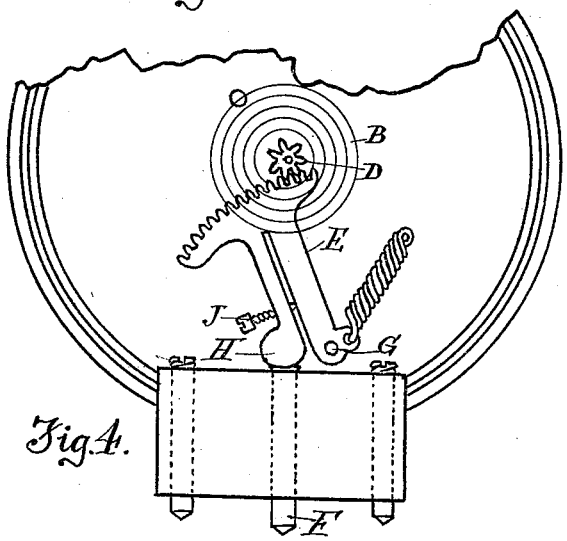
Witnesses:—
Inventor:—
William Gowlland.
By Spear, Middleton, Donaldson & Spear
Attorneys.

UNITED STATES PATENT OFFICE.

WILLIAM GOWLLAND, OF KEMP TOWN, ENGLAND.

LENS-MEASURE.

1,136,419.        Specification of Letters Patent.        Patented Apr. 20, 1915.

Application filed December 14, 1912. Serial No. 736,858.

*To all whom it may concern:*

Be it known that I, WILLIAM GOWLLAND, subject of George V, King of Great Britain and Ireland, and residing at 30 Abbey road, Kemp Town, in the county of Sussex, England, have invented certain new and useful Improvements in Lens-Measures, of which the following is a specification.

Lens measures have been already constructed which measure the curvatures of lenses by pressing three points, or a contact ring and a central point, against their surfaces, the central point or piston actuating a hand that registers the curvature on a dial. Such lens measures, however, are very complicated in construction and expensive, and having a large number of working parts, soon wear and register incorrectly. Also, these different lens measures being made with a case like that of a watch and with a separate plate for the movement or works, and also a separate piece for the extension piece that carries the three points, or the contact ring and point, there is always a source of weakness and error in the different joints as well as expense and difficulty in manufacture.

Now the object of the present invention is to provide an improved lens measure of the type mentioned and for the purpose stated which shall register with accuracy every lens for which it is constructed and of such a design that it can be manufactured easily and cheaply and without the defects mentioned above.

Figure 1 is a plan of the case and Fig. 1ᵃ is a mid-section thereof. Figs. 2 and 2ᵃ are similar views respectively of a case and dial plate, the parts L and S shown in Fig. 2ᵃ being omitted from Fig. 2. Fig. 3 is a mid-section of a modified form of case. Fig. 4 is an incomplete plan showing the operating mechanism on an enlarged scale. Fig. 5 is an incomplete plan of the dial plate on an enlarged scale.

The invention consists chiefly of constructing the main portion of the case A and the extension piece M out of one piece of metal as shown in Figs. 1 and 1ᵃ. Secondly, of a simplified "movement" the bearings for which are formed by the case and dial plate, as shown in the sectional drawing in Fig. 2. This simplified movement may be used either in the types of cases as shown in Figs. 1, 2 and 3 or in any type of case. The case and extension piece, which may be a casting, but is preferably a stamping embossed to shape in one piece, has a ridge embossed on the upper part at A Figs. 1, 1ᵃ, 2 and 3 in the inner edge of which is located the dial plate and over the outer edge of which is fitted the bezel which carries the glass.

The position of the dial plate is accurately registered by means of the two lugs P. P. Fig. 1. These two lugs are formed by the embossing dies at the same time that the case is embossed to shape. The positions of the holes R, R, R, R, that are eventually to be drilled in the case, and also indicated at the same time by the embossing dies by small indentations in the metal.

Another way to make the case and to still adhere to the plan of having the main portion of case and extension piece made of one piece of metal, is to shape the case as above but to fasten a separate plate C Fig. 3 to form the back of the case.

The working parts consist of a pinion D Fig. 4 and hair spring B to which pinion the indicating hand (not shown) is attached, a segment rack E and the usual piston F which presses against the lens. The segment rack E Fig. 4, which works on a bearing G, carried by and near the edge of the case, has an adjustable abutment or leg H against the curved end of which the flat inner end of the piston F abuts, so that when the piston F is pushed inward (while testing a lens) the segment rack E is partly revolved on its central bearing G and so turns the pinion D to which the indicating hand is attached, thus registering the curvature of the lens.

The piston has an enlarged portion *f* at its inner end which prevents it falling out of the instrument.

The end of the adjustable abutment or leg H is shaped with a true curve and the curve may be either a portion of a cylinder or a sphere.

The angular movement of the indicating hand over the dial corresponding to a given movement to the piston F may be varied by altering the distance of the abutment or leg H from the central bearing G to the segment rack E by means of the screw J. This adjustment provides a means of adjusting the instrument after it is assembled and also to suit the refractive index of the glass of which the lenses may be made. I prefer the curvature on the end of the adjustable leg H to be a portion of as large a circle or sphere as possible, so that there shall be as large a bearing as possible and therefore less wear.

The segment rack is so shaped that when the instrument is registering zero the adjustable leg H is in line with the axis of the plunger F, so that when adjusting the leg H to suit the refractive index of the lenses that the instrument is to measure the movement of the leg H practically follows the line of a right angle to the axis of the plunger F. In some instances, I may dispense with this adjustment and simply have the curved adjustment H in contact with the flat end of the piston F.

Instead of having the usual back plate to form the bearing for one end of the pinion, I use a hole partly drilled through the case as shown at K, Fig. 2ª. Also instead of the usual "cocked piece" or bearing for the top end of pinion I use a hole drilled through the dial plate S as shown at L Fig. 2. Provision is made for adjusting the screw J after the instrument is assembled.

The graduations on the dial are cut right through the material as shown at Fig. 5 instead of being marked or engraved on its surface.

Referring to the type of case shown at Figs. 2 and 4, the extension piece is soldered or fastened directly to the case instead of to the usual back plate that usually fits into the round sunk portion of it.

As regards the type of instrument that has a contact ring and a central point I fasten the contact ring to the end of the extension piece.

I use any method of making the "movement" in combination with my methods of making the cases as shown at Figs. 1, 2 and 3.

I claim:

1. In a lens measure, a movable plunger, a case, a dial plate, a toothed segment adapted to be operated by the movable plunger, registering means geared to said toothed segment having a curved surface engaging the said plunger, and an adjustable leg on said toothed segment, substantially as described.

2. In a lens measure of the type in which the registering means are operated by the aid of a movable plunger, a case, a dial-plate, a toothed segment, a bearing for said toothed segment, registering means geared to said toothed segment, a leg forming part of said toothed segment and provided with a curved surface for engagement with said plunger, and means for varying the position of said leg relatively to said bearing.

3. In a lens measure of the type in which the registering means are operated by the aid of a movable plunger, a case consisting of a main portion (A) and an extension (M) embossed or stamped up from a single piece of metal, a dial-plate having its graduations cut completely through it, a toothed segment, a bearing for said toothed segment, a leg forming part of said toothed segment and provided with a surface which is of arc or spherical form for engagement with said plunger, means for varying the position of said leg relatively to said bearing and registering means geared to said toothed segment.

In witness whereof I have hereunto set my hand in the presence of two witnesses.

WILLIAM GOWLLAND.

Witnesses:
H. T. PLACE,
VOLTAS W. WORD.

Copies of this patent may be obtained for five cents each, by addressing the "Commissioner of Patents, Washington, D. C."